A. C. LAUTENSCHLAGER.
CANS FOR PACKING MEAT.
No. 195,139. Patented Sept. 11, 1877.
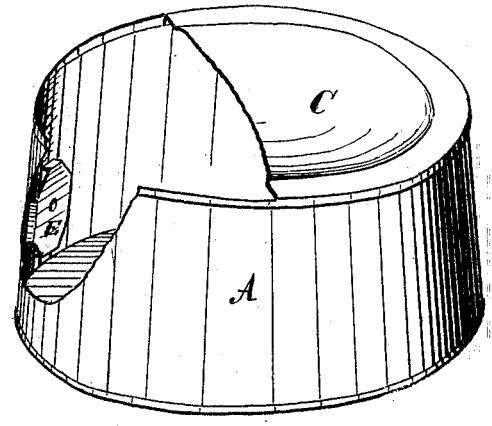
Fig: 1.
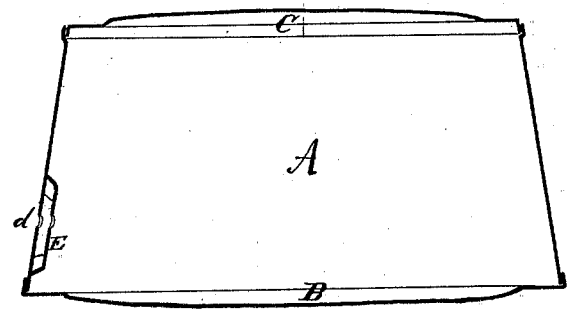
Fig: 2.

UNITED STATES PATENT OFFICE.

A. CHARLS LAUTENSCHLAGER, OF CHICAGO, ILLINOIS.

IMPROVEMENT IN CANS FOR PACKING MEAT.

Specification forming part of Letters Patent No. 195,139, dated September 11, 1877; application filed August 2, 1877.

*To all whom it may concern:*

Be it known that I, A. CHARLS LAUTEN-SCHLAGER, of Chicago, in the county of Cook and State of Illinois, have invented certain Improvements in Cans for Packing Meat, of which the following is a full and exact description, reference being had to the accompanying drawing, in which—

Figure 1 is a perspective view of the can with part of its top and side broken away, so as to show the vent-shield; and Fig. 2 is a longitudinal section through the center of the can.

The nature of my invention relates to certain improvements in cans into which meat is packed and preserved to enable its being shipped to distant markets in a fresh and healthful condition; and it consists in the peculiar shape and construction of the shield or fender for protecting the vent-hole, through which the air is exhausted from the can after the meat is packed therein, against getting choked up by the contents of the can.

A is the body of an oval conical can, having bottom B. Into this can the meat is packed, and hermetically inclosed therein by the cover C. The bottom as well as the cover is pressed concave, and will become convex by the formation of a vacuum inside of the can, which is accomplished by placing the cans, after being filled and closed up, on their ends, and by exposing the same to a boiling-heat, when the air within will be expelled through a small punch-hole, $d$, cut through one end of the body A of the can, and which is closed up by a drop of solder for excluding the air while the can is allowed to cool off.

It is of great importance that the vent $d$ should be protected in such a manner that it cannot be clogged by the contents of the can, so as to prevent the complete expelling of the atmospheric air from the can, which heretofore was aimed at by soldering a strip of tin to the inside of the casing, so as to bridge the vent-hole, so as to give the air access to the vent from under both sides of said strip. This proved of limited success, however, since the two narrow passages thus provided were frequently clogged by the fatty substance pertaining to the meat.

Now, for obviating the above-described impediment, I use a shield or fender, E, made of a rhombus-shaped piece of tin with a small hole punched through its center, and with its four corners bent angularly. This shield is soldered against the inside of the can-body A, so as to cover the vent $d$ with its longest diagonal line vertical, to present one of its bent corners toward the top, or to that side whence the meat is entered into the can, so as to turn off the meat from the vent while being packed.

The shield B is set off the inner face of the can-body wall, so as to admit a free-air access toward the vent $d$ from four sides and through the hole in its center, thereby insuring its escape from the can through one or another of these openings, since it is not possible that all of these passages should be so crowded by the packed meat as to be obstructed.

What I claim as my invention, and desire to secure by Letters Patent, is—

The combination, with a meat-preserving can having the vent-hole $d$, of the rhombus-shaped shield E, turned at its corners and supported on the inside of the can, so as to allow the air to pass out through four or more apertures, constructed substantially as described and shown.

A. CHARLS LAUTENSCHLAGER.

Witnesses:
WM. H. LOTZ,
EMIL H. FROMMANN.